(Model.)

E. WALTON, Sr.
APPARATUS FOR OYSTER CULTURE.

No. 463,397.  Patented Nov. 17, 1891.

Witnesses
James P. Bannon
George P. Warfield Jr.

Inventor
Edward Walton Sr.

UNITED STATES PATENT OFFICE.

EDWARD WALTON, SR., OF BALTIMORE, MARYLAND.

APPARATUS FOR OYSTER CULTURE.

SPECIFICATION forming part of Letters Patent No. 463,397, dated November 17, 1891.

Application filed February 24, 1891. Serial No. 382,543. (Model.)

*To all whom it may concern:*

Be it known that I, EDWARD WALTON, Sr., a citizen of the United States, residing in the city of Baltimore and State of Maryland, have invented new and useful Improvements in Oyster Culture and Means and Apparatus Necessary for Use Therein, of which the following is a specification.

My invention relates to improvements in oyster culture and the arrangement of artificial oyster-beds, and are distinguished by certain new features, whereby the breeding and feeding of oysters are effected under hygienic conditions.

The objects of my improvements are, first, to supply the oysters with water of their natural temperature; secondly, to supply the oysters with water containing salt or fattening material artificially supplied thereto; thirdly, to collect the spat from the oysters by means of collectors arranged in connection with the artificial beds. I accomplish these objects by the mechanism illustrated in the accompanying drawings, in which—

Figure 1:
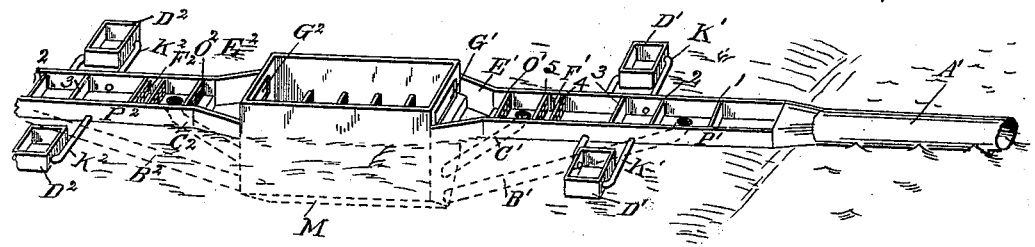
Figure 2:
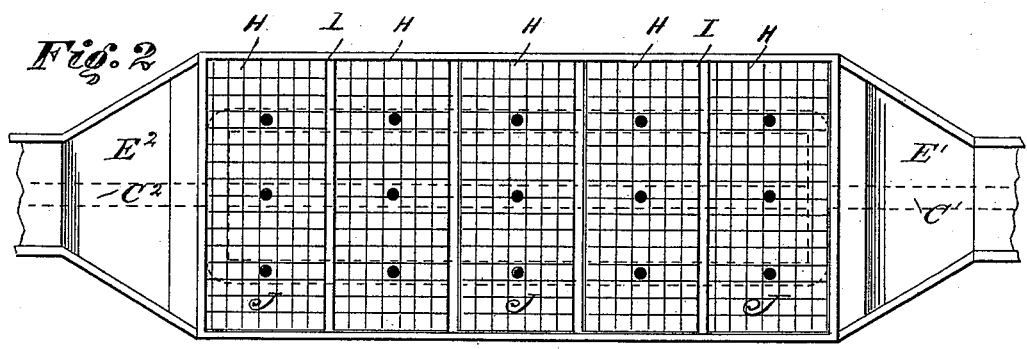
Figure 3:
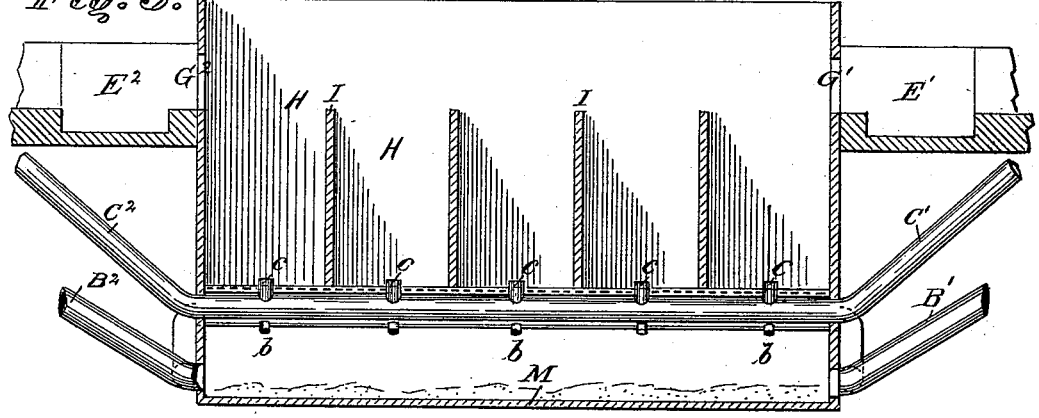
Figure 4:
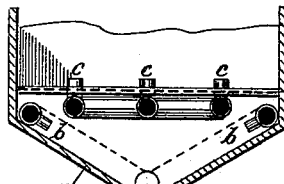

Figure 1 represents a view of the general plan of my improved oyster-pond with its tunnels, troughs, locks, conduits, salt-boxes, and spat-boxes, excepting an extension of the trough $P^2$ and tunnel $A^2$, which are not shown, but are of like construction as trough $P'$ and tunnel $A'$. Fig. 2 represents a top view of the artificial oyster-pond, showing the slatted shelf or oyster-bed resting over three sections of the supply-mains with openings for the introduction of water to the same in each section, also a top view of the two spat-boxes. Fig. 3 represents a vertical section of the oyster-pond on a large scale, comprising by way of example five equal compartments formed by four inside partition-walls of masonry, the slatted oyster-beds resting on one section of the conduit underlying the same with openings therein for the admission of water to each compartment, the inclined bottom with one section of the conduit with open end entering at the lowest point at each end of said inclined bottom, and another section of said conduit with openings therein, resting on the highest point of the inclined bottom and running the entire length thereof, and the spat-boxes, one at each end of said pond and connected therewith by the openings in the outside walls. Fig. 4 represents a view of the end or vertical cross-section of the improved oyster-bed, the inclined bottom with one section of the conduit with openings therein on each side of said inclined bottom, and the three sections of the other conduit with openings in each upward through the slatted shelf or oyster-bed resting immediately over and on said three sections of said conduit.

Similar letters refer to similar parts throughout the several views.

The tunnels $A'$ and $A^2$ constructed underground run from deep water to trough $P'$ and $P^2$. In each of said troughs are constructed locks 1, 2, and 3, slatted gates 4 and 5 forming the salt-boxes $F'$ and $F^2$ on either side of said troughs and connected therewith by pipes $K'$ and $K^2$ are salt-boxes $D'$ and $D^2$. At the other end of said troughs are constructed the spat-boxes $E'$ and $E^2$, connected by openings $G'$ and $G^2$ with the pond or system of ponds H H H.

Connected with and diverging from the bottom of the troughs $P'$ and $P^2$ are two conduits $B'$ and $B^2$ and $C'$ and $C^2$, the first two of which divide each into three parts or sections and approach and enter the end of the artificial pond or system of ponds, one each of said three sections at the lowest point on the inclined bottom M and one each of the other two sections enter said pond at the highest point on top of said inclined bottom, one on either side, and run parallel therewith the entire length of the pond or system of ponds with openings $b\ b\ b$ in each section and uniting the said conduits $B'$ and $B^2$. The other two of said conduits $C'$ and $C^2$ each diverge into three sections, which approach and enter the ends of the artificial pond or system of ponds H H H at a point a certain distance above the inclined bottom M and run parallel with and at an equal distance one from the other and on the same level in and through the pond or system of ponds with one or more openings $c\ c\ c$ in each section the entire length of said pond or ponds and uniting the said two conduits $C'$ and $C^2$.

The artificial oyster-pond consists, first, in the construction of the inclined bottom M out of cement or masonry running lengthwise of said pond. At the lowest point on said bottom at each end, projecting a slight distance inward, are the open ends of one each of the three sections of the conduits B' and B², and on either side of said bottom, resting on top of its incline, are the other two sections of conduits B' and B². Resting on arched foundations and a short distance above the said bottom are the three sections of conduits C' and C². Resting on and supported by these last-named three sections of conduits C' and C² is the slatted wood or metal base, shelf, or bed J J J, on which the oysters are placed in layers or in slatted boxes or baskets in as many stages as may be desired, supporting each stage with a slatted bed or shelf. The whole may be constructed as one pond; or it may be divided into five or more compartments or ponds formed by the erection on the inside of partitions of masonry I I I not to exceed in height the level of the average low tide.

Circumscribing the artificial pond or ponds containing the oyster-beds is a wall of masonry to any height desired, not less than the average high tide. Constructed in the end walls surrounding the pond on a level with the tops of the partition-walls are openings G' and G², leading to the spat-boxes. The spat boxes or ponds E' and E² are constructed in a triangular shape outside of and adjoining the end walls of the ponds with which they are connected, each of a depth of two or more feet below the troughs P' and P², with which they are connected. The spat is collected by a layer of shells on the bottom of the spat boxes or ponds and by screens O' and O² across the entrance of the troughs P' and P² thereto. On the sides of and of equal depth with the troughs P' and P² are constructed two salt-boxes D' and D² and connected therewith by pipes K' and K².

My artificial oyster-pond or system of ponds is destined to be constructed on land or partially in the water, lengthwise or obliquely across a bar or neck or point of land wholly or partially separating two natural bodies or streams of water and connected with each of said bodies or streams at a depth to secure water of the oyster's natural temperature by means of the tunnels, troughs, and conduits above described, and is destined to work or operate as follows: On the rise of the tide, the water enters the tunnel A', thence through trough P' to entrance of conduit B', then dividing and a portion thereof passes through conduit B' and its three sections to and over the inclined bottom M, thence in and out the conduit B² to trough P². The whole quantity of water may be caused to pass in this direction when desired by closing lock Q. The other portion of the water, divided as aforesaid, passes along trough P' to entrance of conduit C', thence through the said conduit and its sections, thence by means of the openings $c$ $c$ $c$ in each section up through the ponds H H H and the artificial oyster-beds J J J, thence through the opening G², through the spat-box E² and collector O² to trough P², uniting with the water from conduit B², and thence through tunnel A² to the sea or other body of water. On the ebb of the tide the water enters and passes through the entire apparatus, exactly as above described, but in a reverse manner and direction. When it is desired to use the salt-boxes D' and D², gate 3 is closed and the water is caused to pass by pipes K' and K² through said salt-boxes back to the trough, and thence through the whole apparatus, as described.

I am aware that prior to my invention apparatus for the cultivation of oysters by artificial means have been made; I therefore do not claim such invention broadly; but What I do claim as my invention, and desire to secure by Letters Patent, is—

1. A bed for the artificial culture of oysters, combining a tank having a series of spat-compartments therein and conduits connected therewith, said conduits being provided with pipes leading from the bottom thereof and beneath said tank and communicating with the spat-compartments by means of the tubes thereon.

2. A bed for the artificial culture of oysters, comprising a tank having a convex bottom and pipes communicating with spat-boxes therein, conduits connected therewith, said conduits having compartments at their abutting ends, and gates in said tank opening into said conduits.

3. A bed for the artificial culture of oysters, having a tank and suitable spat-boxes, conduits and tubes connected therewith, salt-boxes connected by pipes to said conduits, whereby the water conveyed to the spat may be properly salted.

In witness whereof I hereunto sign my name.

EDWARD WALTON, Sr.

Witnesses:
JAMES P. BANNON,
GEORGE T. WARFIELD, Jr.